Patented June 11, 1940

2,203,677

UNITED STATES PATENT OFFICE 2,203,677

ADHESIVE

Richard Gurley Drew, St. Paul, Minn., assignor to Minnesota Mining & Manufacturing Company, St. Paul, Minn., a corporation of Delaware No Drawing. Application February 18, 1938, Serial No. 191,266

6 Claims. (Cl. 260—709)

This invention relates to an adhesive or cement composition adapted to form normally tacky and pressure-sensitive adhesive coatings, and comprised of rubber and ester gum dispersed in a suitable volatile liquid vehicle.

An object of the invention is to provide an adhesive composition which may be applied to a wide variety of surfaces to form an adherent adhesive coating, including paper, leather, glass, and films of regenerated cellulose, cellulose esters and ethers (as cellulose acetate and ethyl cellulose), and resin films, etc. When applied to smooth impermeable surfaces, not having a special bonding action, an adhesive coating is formed which may be stripped off. The adhesive coating formed upon evaporation of the vehicle is normally tacky and pressure-sensitive, that is, under ordinary atmospheric conditions the adhesive coating is stably in a condition such that it does not need to be activated by heat or solvents or otherwise prepared in order to exert an adhesive action.

Thus the adhesive composition may be spread upon a backing to form a stable tacky adhesive coating upon evaporation of the vehicle, permitting the backing to be pressed against a desired surface to secure immediate complete adhesion without waiting for any drying or setting action. In this case the adhesive with the backing to which it was first applied may be stripped from the second surface without leaving a residuum of adhesive thereupon, for the adhesive coating is most firmly united to the surface to which applied in disperse form (since a more intimate contacting is effected), and the final adhesive coating possesses greater internal cohesiveness than the adhesiveness of its surface.

A further object is to provide an adhesive composition which will form transparent adhesive coatings.

In the description and claims it will be understood that I refer to the low-acid type of ester gum (acid number generally 2 to 10). I have discovered that this type of resin has unsuspected advantages in comparison with related types. If wood rosin is used, there will be a gradual development of small crystals throughout the adhesive coating, while if gum rosin is used there will be an absence of crystallization but a more rapid aging of the rubber, and furthermore gum rosin imparts inferior color and transparency. The use of ester gum makes for better aging and there is an entire absence of crystallization, while the color and transparency of the adhesive coatings are as good as when the best grade of wood rosin is employed. The use of ester gum makes for greater cohesiveness (firmness) in the adhesive coating.

A further desirable characteristic of ester gum, which I have discovered, is that an adhesive made therefrom may contain certain coloring pigments of a type which would catalyze oxidation of the rubber component if rosin were employed in place of ester gum. Thus my present adhesive may be colored by incorporation of gold bronzing powder (powdered brass, containing copper and zinc). If this bronzing powder were employed in a rubber-rosin adhesive, the rubber would quickly age due to the strong catalytic action of the copper in the presence of rosin.

The following examples illustrate adhesive compositions prepared in accordance with my invention, all parts being by weight.

Example 1

| | Parts |
|---|---|
| Milled latex crepe | 250 |
| Ester gum | 175 |
| "Flectol B" (antioxidant) | 1.25 |
| Heptane (volatile solvent) | 2500 |

The raw latex crepe is milled for about 10 minutes, at a temperature of about 140–150° F., and is then cut into small pieces.

The ester gum is dissolved in an equal amount of the solvent, and the "Flectol B" is likewise dissolved in a portion of the solvent. The balance of the solvent (to make a total of 2500 parts) is placed in a suitable churn and the solutions of ester gum and "Flectol B," and the milled latex crepe, are added. The mixture is mixed until homogeneous, involving mixing for about 40 hours at a temperature of about 70–100° F. The resulting adhesive solution is ready for use to form, upon spreading and evaporation of the solvent, a normally tacky and pressure-sensitive transparent adhesive coating.

The indicated heptane may be substituted for by another volatile rubber solvent such as benzol or naphtha. It will be understood that the proportion of solvent may be varied to produce the desired viscosity of the adhesive composition. Thus the proportion in the above formula may be increased to make for easier brushing or spreading and a thinner coating.

For forming highly aggressive and highly cohesive adhesive coatings, the ester gum should be used in the ratio of about 0.5–0.9 part per part of rubber. The ratio in the above formula is 0.7. To form coatings which are less tacky, but still "pressure-sensitive," the ratio may be reduced to as low as 0.2, and even smaller ratios may be employed where only a comparatively slight tack is desired. For forming highly aggressive adhesive coatings of less cohesiveness, the ratio may be increased up to four (4) parts ester gum to one (1) part rubber. The degree of adhesiveness is also influenced by the extent to which the rubber has been milled—the greater the milling the less ester gum needed for a given adhesiveness. However, extended milling will cause the adhesive coating to have less body (firmness).

*Example 2*

|  | Parts |
|---|---|
| Milled latex crepe | 250 |
| Ester gum | 175 |
| "Flectol B" | 1.25 |
| Heptane | 1550 |
| Alcohol | 15.5–31 |

The procedure is the same as in the preceding example.

The alcohol may be denatured ethyl alcohol (for example containing 5 volumes of methyl alcohol or ethyl acetate per 100 volumes of 190 proof ethyl alcohol) or may be methyl alcohol. The function of the alcohol is to reduce the quantity of rubber solvent required to produce a solution of desired viscosity, the alcohol being effective even in small proportions as a viscosity-reducer.

In the above examples, "Flectol B" (a liquid condensation product of acetone and aniline) is used as an antioxidant to improve the rubber aging qualities. Other suitable antioxidants or age-resistors are: "Flectol H" (a solid condensation product of acetone and aniline), "Solux" (p - hydroxy - N - phenylmorpholine), "Agerite Resin" (aldol-alpha-naphthylamine reaction product), "Antox", beta-naphthol, "Agerite Alba" and "Agerite White." Those which are soluble in the rubber solvent may be added directly, otherwise they may be milled into the rubber during the initial milling.

As previously mentioned, a coloring pigment may be incorporated in the adhesive. This may be conveniently accomplished by milling the pigment into the rubber during the preliminary milling of the latter. Thus, para toluidine red may be added to give a red color, or gold bronzing powder to give a gold color. Zinc oxide may be incorporated if desired.

What I claim is as follows:

1. An adhesive composition adapted to form highly coherent normally tacky and pressure-sensitive transparent adhesive coatings, comprising one part raw rubber and 0.2–4 parts low-acid type ester gum dispersed in a volatile vehicle.

2. An adhesive composition adapted to form highly coherent normally tacky and pressure-sensitive transparent adhesive coatings, comprising one part lightly milled raw rubber and 0.2–4 parts low-acid type ester gum dispersed in a volatile vehicle.

3. An adhesive composition adapted to form highly coherent normally tacky and pressure-sensitive transparent adhesive coatings free from crystallization development, comprising one part latex rubber and 0.2–4 parts low-acid type ester gum dispersed in a volatile vehicle.

4. An adhesive composition adapted to form highly coherent normally tacky and pressure-sensitive transparent adhesive coatings free from crystallization development, comprising one part latex rubber and 0.2–4 parts low-acid type ester gum, and a small proportion of a rubber antioxidant, dissolved in a volatile rubber solvent.

5. An adhesive composition adapted to form highly coherent normally tacky and pressure-sensitive transparent adhesive coatings free from crystallization development, comprising one part latex rubber, 0.5–0.9 parts low-acid type ester gum, and a small proportion of a rubber antioxidant, dissolved in a volatile rubber solvent.

6. An adhesive composition adapted to form highly coherent normally tacky and pressure-sensitive transparent adhesive coatings, comprising one part raw rubber and 0.2–4 parts low-acid type ester gum dissolved in a volatile hydrocarbon rubber solvent containing a small proportion of alcohol.

RICHARD GURLEY DREW.